azine or 1-[2-(p-bromobenzoyl)-cyclopropylmethyl] - 4 - phenylpiperazine, respectively.

Use of 2-(m-toluyl)-cyclopropanecarboxylic acid in the above procedure gives 1-[2-(m-toluyl)-cyclopropylmethyl]-4-phenylpiperazine.

EXAMPLE 6

Following the procedures of Example 1, 2-(p-fluorobenzoyl)-cyclopropanecarboxylic acid triethylamine salt is reacted with ethyl chloroformate and 1-(o-methoxyphenyl)-piperazine is added to the anhydride thus formed to yield the amide. The ethylene ketal derivative of the amide is reduced with lithium aluminum hydride and the ketal group removed by acid hydrolysis to give 1-[2-(p-fluorobenzoyl) - cyclopropylmethyl] - 4 - (o-methoxyphenyl)-piperazine.

What is claimed is:
1. A compound of the formula:

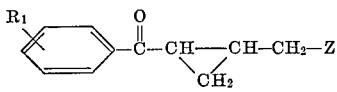

the ethylene ketal thereof or a pharmaceutical acceptable acid addition salt of said compound or ethylene ketal, wherein:

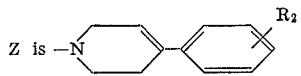

and
$R_1$ and $R_2$ are each hydrogen, chloro, bromo, fluoro, trifluoromethyl, methyl or methoxy.

2. A compound according to claim 1 in which the compound is the free ketone.

3. A compound according to claim 2 in which Z is

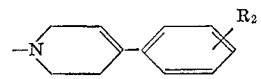

4. A compound according to claim 3 in which $R_1$ and $R_2$ are both hydrogen, being the compound 1-(2-benzoyl-cyclopropylmethyl)-4-phenyl-1,2,5,6-tetrahydropyridine.

5. A compound according to claim 3 in which $R_1$ is hydrogen and $R_2$ is p-chloro, being the compound 1-(2-benzoylcyclopropylmethyl)-4-(p-chlorophenyl) - 1,2,5,6-tetrahydropyridine.

6. A compound according to claim 1 in which the compound is the ethylene ketal.

7. A compound according to claim 6 in which Z is

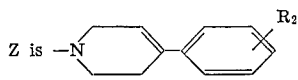

8. A compound according to claim 7 in which $R_1$ and $R_2$ are both hydrogen, being the compound 1-(2-benzoyl-cyclopropylmethyl - 4 - phenyl-1,2,5,6-tetrahydropyridine ethylene ketal.

References Cited

UNITED STATES PATENTS 3,030,372  4/1962  Janssen et al. _____ 260—297
3,476,760  11/1969  Kaiser et al. _____ 260—293.4

ALAN L. ROTMAN, Primary Examiner

U.S. Cl. X.R.

260—268, 294.8, 295, 520, 546, 294.7, 473, 999

United States Patent Office 3,553,226
Patented Jan. 5, 1971

3,553,226
1-(2-BENZOYLCYCLOPROPYLMETHYL)-4-PHEN-
YL-1,2,5,6-TETRAHYDROPYRIDINES
Carl Kaiser, Haddon Heights, N.J., and Charles L. Zirkle,
Berwyn, Pa., assignors to Smith Kline & French Laboratories, Philadelphia, Pa., a corporation of Pennsylvania
No Drawing. Filed Apr. 4, 1968, Ser. No. 718,915
Int. Cl. C07d 31/28
U.S. Cl. 260—297                                                  8 Claims

ABSTRACT OF THE DISCLOSURE

1 - (2 - benzoylcyclopropylmethyl) - 4 - phenyl-1,2,5,6-tetrahydropyridines and related 4-phenylpiperazines in which the benzoyl group and/or the phenyl moiety may be substituted by chloro, bromo, fluoro, trifluoromethyl, methyl or methoxy, as well as the ethylene ketals thereof, have tranquilizing activity. The compounds are generally prepared from a 2-benzoylcyclopropanecarboxylic acid via reaction of the triethylamine salt with ethyl chloroformate to give the mixed anhydride which is condensed with a 4-phenyl-4-piperidinol or 1-phenylpiperazine to give a corresponding amide. The ethylene ketal of the amide is reduced to the cyclopropylmethyl derivative which is hydrolyzed with acid to the free ketone product.

This invention relates to novel 1-(2-benzoylcyclopropylmethyl)-4-phenyl-1,2,5,6-tetrahydropyridines and related 4-phenylpiperazines having useful pharmacodynamic activity. More specifically the compounds of this invention have tranquilizing activity as demonstrated in standard animal pharmacological test procedures. Exemplary of the activity of the compounds of this invention is the decreased motor activity, hypotonia, miosis, hypothermia and ptosis produced in rats upon oral administration of 25–200 mg./kg. At these dose levels no toxicity is observed.

The compounds of this invention are represented by the following general structural formula:

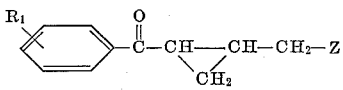

FORMULA I in which:

Z represents

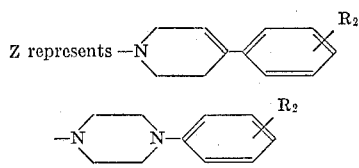

and
$R_1$ and $R_2$ each represent hydrogen, chloro, bromo, fluoro, trifluoromethyl, methyl or methoxy.

Also part of this invention are the ethylene ketals of the compounds of Formula I.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydobromic, sulfuric, sulfamic, phosphoric and nitric acids.

The compounds of this invention may be present as cis-trans isomers due to the geometrical arrangement of the benzoyl moiety and the heterocyclic substituent with respect to the cyclopropane ring and further as d,l optical isomers. Unless otherwise specified in the description and accompanying claims, it is intended to include all isomers, whether separated or mixtures thereof.

The compounds of this invention are prepared from 2-benzoylcyclopropanecarboxylic acids having the formula:

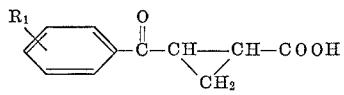

FORMULA II wherein $R_1$ is as defined above, which are prepared from 2-carbethoxycyclopropanecarboxylic acid chloride by reaction with $R_1$-substituted benzene and aluminum chloride under Friedel-Crafts conditions, followed by hydrolysis of the 2-benzoylcyclopropyl ester to the free acid. The useful compounds of Formula II are converted to the products of this invention by reaction with a lower alkyl haloformate, preferably ethyl chloroformate, in the presence of a tertiary amine such as triethyl amine to give the corresponding 2-benzoylcycyopropyl mixed anhydride. The anhydride is then treated with a 4-($R_2$-substituted phenyl)-4-piperidinol or a 1-($R_2$-substituted phenyl)-piperazine to give a 2-benzoylcyclopropanecarboxamide. The amide is reacted with ethylene glycol in the presence of p-toluenesulfonic acid to give the ethylene ketal of the dehydrated 1,2,5,6-tetrahydropyridine carboxamide or the ethylene ketal of the piperazine carboxamide. The ethylene ketal carboxamide is reduced with, for example, lithium aluminum hydride to give the corresponding cyclopropylmethyl compound which is hydrolyzed by acid such as a mineral acid, for example hydrochloric acid, to yield the 2-benzoylcyclopropylmethyl product.

In addition to the utility of the ethylene ketal derivatives of the 2-benzoylcyclopropylmethyl compounds of Formula I as transquilizers described above, it will be noted that these derivatives also are useful as intermediates for the preparation of the free ketones.

The compounds of this invention may be administered orally or parenterally in conventional dosage unit forms such as tablets, capsules, injectables or the like, by incorporating the appropriate dose of a compound of Formula I or its ethylene ketal derivative, either as the free base or an acid addition salts thereof, with carriers according to accepted pharmaceutical practices.

The foregoing is a general description of how to prepare the compounds of this invention. The following examples illustrate the preparation of specific compounds having tranquilizing activity. However this should not be construed as limiting the scope of the invention since appropriate variations in the starting materials, for example employing a corresponding cis isomer for a trans compound, will produce other products set forth hereinabove.

PREPARATIONS (A) 2-benzoylcyclopropanecarboxylic acid.—A solution of 109.4 g. (0.693 m.) of trans-2-carbethoxycyclopropanecarboxylic acid and 66.5 ml. (0.923 m.) of thionyl chloride is stirred on the steam bath for one hour. The reaction mixture is distilled to give the acid chloride, B.P. 105–115° C./30 mm.

To a mixture of 14.6 g. (0.11 m.) of aluminum chloride in 50 ml. of dry benzene, at room temperature with stirring, is added dropwise 17.7 g. (0.1 m.) of the above prepared acid chloride. This mixture is stirred and refluxed for one hour and then poured into ice-water-ether. The water layer is washed with ether and the ether-benzene